United States Patent
Kawamata

(10) Patent No.: US 7,508,323 B2
(45) Date of Patent: Mar. 24, 2009

(54) ROTATION-ANGLE DETECTING APPARATUS

(75) Inventor: Naoki Kawamata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/030,764

(22) Filed: Feb. 13, 2008

(65) Prior Publication Data
US 2008/0211694 A1 Sep. 4, 2008

(30) Foreign Application Priority Data
Feb. 15, 2007 (JP) ............................. 2007-034442

(51) Int. Cl.
*H03M 1/22* (2006.01)
(52) U.S. Cl. .......................................... 341/13; 341/11
(58) Field of Classification Search .................. 341/13, 341/11; 250/231.13, 550, 238, 552, 309, 250/223, 368; 235/454; 358/1.12, 406; 702/188, 702/168; 356/326; 324/207; 701/70; 369/270
See application file for complete search history.

(56) References Cited

U.S. PATENT DOCUMENTS

| | | | | |
|---|---|---|---|---|
| 3,850,435 A | * | 11/1974 | Birch | ......................... 369/220 |
| 5,019,981 A | * | 5/1991 | Oshita et al. | ................... 701/41 |
| 5,528,227 A | | 6/1996 | Eguchi | |

FOREIGN PATENT DOCUMENTS

JP 06-102055 A 4/1994

* cited by examiner

*Primary Examiner*—Rexford Barnie
*Assistant Examiner*—Joseph Lauture
(74) *Attorney, Agent, or Firm*—Canon U.S.A. Inc., I.P. Division

(57) ABSTRACT

A rotation-angle detecting apparatus detects a rotation angle of a rotating disc having radial markings, includes a plurality of detectors arranged at opposite sides of the axis of rotation of the disc and facing the markings, each of the detectors operable to detect a light beam from the markings, and outputting a pair of periodic signals having a 90-degree phase difference between the members of the pair; an analog-to-digital converter arranged to convert pairs of periodic signals from the detectors into pairs of digital signals; a digital signal processor configured to process the pairs of digital signals from the analog-to-digital converter; a binarization unit arranged to binarize the pairs of periodic signals from the detectors; and a counter arranged to count the pairs of periodic signals binarized by the binarization unit. The digital signal processor determines the rotation angle of the disc based on the pairs of digital signals from the analog-to-digital converter and count results from the counter.

1 Claim, 7 Drawing Sheets

ROTATION-ANGLE DETECTING APPARATUS

BACKGROUND OF THE INVENTION

1. Field of the Invention

The present invention relates to rotation-angle detecting apparatuses, and particularly, but not exclusively, to a rotation-angle detecting apparatus having a plurality of detection units.

2. Description of the Related Art

Japanese Patent Laid-Open No. 6-102055 describes a rotation-angle detecting apparatus for detecting a rotation angle by detecting changes in scales mounted on a rotating shaft. In the rotation-angle detecting apparatus, a plurality of detection units (rotary encoders) are arranged around the rotating shaft at positions facing the scales and the results obtained by the individual detection units are averaged, thereby reducing the effect of eccentricity of the rotating axis.

In order to process signals from two detection units to obtain a rotation angle and to perform digital signal processing using a digital signal processor, computing is performed at successive predetermined time intervals. If the period of the periodic signals from the detection units is shorter than the predetermined time interval, not all the information can be obtained simply by obtaining discrete digital values converted from the periodic signals. That is, if the period of the periodic signals is shorter than the predetermined time interval, it is impossible to determine the number of cycles within the predetermined time interval.

In order to compensate for this problem, detection signals are binarized (i.e. converted to a signal having one of two discrete values, the value changing when the signal crosses zero, which happens twice during each period for a sinusoidal signal) and the cycles are counted using a counter that is different from the digital signal processor. The counter can count all the cycles regardless of the time interval in digital signal processing. The digital signal processor obtains the count result at the predetermined time intervals so that no information will be lost. In known methods, periodic signals to be divided must remain as analog signals, which should then be binarized so that the cycles can be counted.

There are two known methods, which will be described below, for obtaining a rotation angle from signals of two detection units.

The first method is a method of generating an averaged pair of periodic signals by combining two pairs of periodic signals using a hardware component, such as an analog multiplier, and, thereafter, performing the normal processing.

FIG. 9 is a diagram showing circuits for performing this processing. The following processing calculations are performed on two pairs of periodic signals (Ca and Sa) and (Cb and Sb) one pair from each of two detection units, using multiplier circuits, an adder circuit, and a subtractor circuit, thereby obtaining periodic signals C and S:

$$S = Sa*Cb + Ca*Sb$$
$$C = Ca*Cb - Sa*Sb \quad (1)$$

Such each pair of signals having a 90 degree phase difference can be produced from a single scale.

FIG. 10 shows the relationship between the periodic signals before and after the processing. The cycle of the obtained periodic signals C and S is half the cycle of the original periodic signals before the processing, and the phases are averaged. Since the periodic signals C and S are averaged as analog signals, the processing from this point onward regards the periodic signals C and S as normal signals, and known processing can be performed, as described next.

Using normal processing, the periodic signals C and S are converted to digital signals, which in turn are divided. The periodic signals C and S are binarized using a zero-crossing circuit, and counting processing is performed. From these two pieces of information, rotation-angle information is generated.

The second method is a method of individually performing analog-to-digital conversion and counting of two pairs of signals, performing independent processing using a digital signal processor, and obtaining an average.

In the first known method, averaging is performed using analog signals. Thus, processing using hardware components shown in FIG. 9, that is, analog multiplication, addition, and subtraction, must be performed.

In the second known method, division processing is performed by performing two divisions for each signal using the digital signal processor. Thus, the processing time becomes long.

This is because, in order to divide periodic signals using digital signal processing techniques, the ratio between analog-to-digital-converted values of the two periodic signals must be calculated. The ratio is obtained by calculating a division. In general, divisions calculated using digital signal processing techniques require a long calculation time.

With the known methods lower cost and higher processing speed cannot be achieved at the same time.

SUMMARY OF THE INVENTION

The present invention provides a rotation-angle detecting apparatus for improving the cost and the processing speed.

According to an aspect of the present invention, there is provided a rotation-angle detecting apparatus for detecting a rotation angle of a rotating disc having radial markings, including a plurality of detectors arranged at opposite sides of the axis of rotation of the rotating disc and facing said markings, each of the plurality of detectors operable to detect a light beam from said markings, each of said detectors outputting a pair of periodic signals having a 90-degree phase difference between the members of the pair; an analog-to-digital converter arranged to convert a plurality of pairs of periodic signals from the plurality of detectors into a plurality of pairs of digital signals; a digital signal processor configured to process the plurality of pairs of digital signals from the analog-to-digital converter; a binarization unit arranged to binarize the plurality of pairs of periodic signals from the plurality of detectors; and a counter arranged to count the plurality of pairs of periodic signals binarized by the binarization unit. The digital signal processor determines the rotation angle of the rotating disc based on the plurality of pairs of digital signals from the analog-to-digital converter and count results from the counter.

Further features of the present invention will become apparent from the following description of exemplary embodiments with reference to the attached drawings.

DESCRIPTION OF THE EMBODIMENTS

A rotation-angle detecting apparatus according to an embodiment of the present invention will be described in detail with reference to FIGS. 1 to 8.

Figure 1:
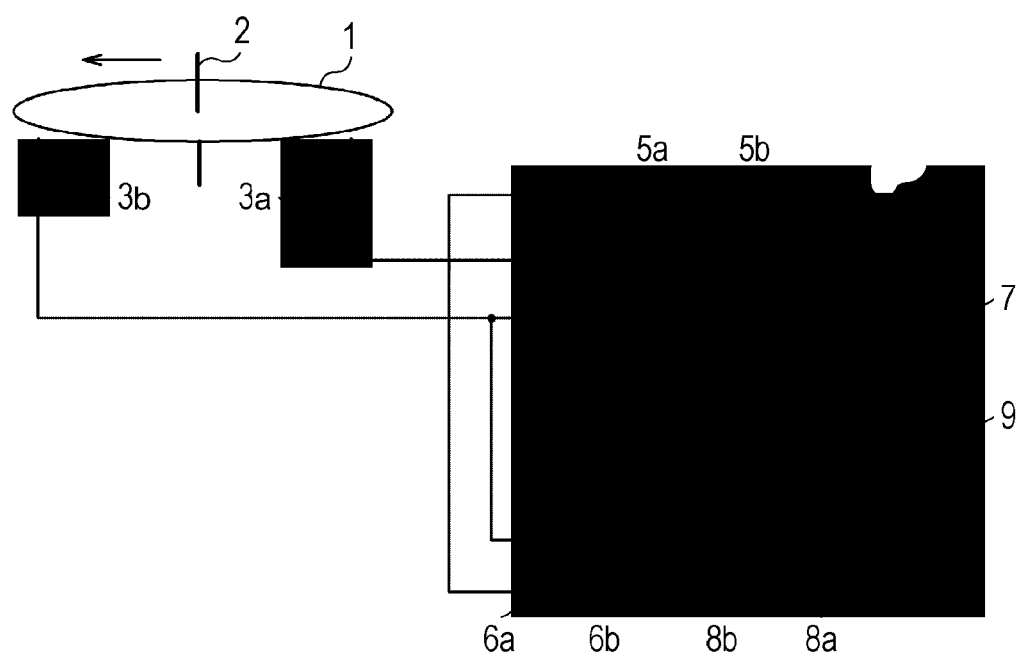
FIG. 1 is a block diagram showing circuits according to an embodiment of the present invention.

FIG. 1 is a block diagram showing circuits according to the embodiment. A disc-shaped rotating disc 1 is mounted onto a rotating shaft 2 and rotates in conjunction with an object to be detected, which is an object regarding which rotation information is to be detected. A scale having marks at equal distances extending in a radial direction is provided on a surface of the rotating disc 1 around the rotating shaft 2. Detection units 3a and 3b are arranged at two points, facing the scales on opposite sides of the shaft 2, so that the detection units 3a and 3b are symmetrical about the rotating shaft.

Each of the detection units 3a and 3b includes a light-emitting portion that emits a light beam towards the rotating disc 1 and a light-receiving portion that detects the light beam reflected from the rotating disc 1. The detection units 3a and 3b detect light beams based on rotation information obtained at the two points on the rotating disc 1 at the same time. Accordingly, if the center of the rotating disc 1 is displaced slightly relative to the center of rotation, that is, if there is eccentricity, eccentricity information is detected as sign-inverted information by the detection units 3a and 3b.

Based on rotation information of the rotating disc 1, the detection units 3a and 3b each output a pair of periodic signals (Ca and Sa) and (Cb and Sb), with an approximately 90-degree phase difference between the two signals in each pair, respectively. Therefore, a detection error in the rotation information due to eccentricity or the like can be compensated for by obtaining an average of the outputs of the detection units 3a and 3b.

The output signals from the detection units 3a and 3b are connected in parallel to analog-to-digital converters 5a and 5b and binarization units 6a and 6b, respectively. Input signals of the analog-to-digital converters 5a and 5b are converted to digital values at predetermined time intervals, and the digital values are output to a digital signal processor 7. The binarization units 6a and 6b binarize the two periodic signals from the detection units 3a and 3b and outputs binarized signals to counters 8a and 8b, respectively. As described above, this can be performed using a zero-crossing detector circuit. The counters 8a and 8b count every rising and falling edge of the binarized signals and output the count results to an adder 9. The adder 9 adds the count results obtained by the counters 8a and 8b and outputs the added result to the digital signal processor 7 at the predetermined time intervals. The digital signal processor 7 performs predetermined processing.

In order not to lose cycle information even when the cycle of the periodic signals is shorter than the predetermined time interval, the counters 8a and 8b must count all the cycles. To this end, the counters 8a and 8b are configured as hardware components so that the counters 8a and 8b do not depend on the time interval in the digital signal processor 7. Also, the adder 9 may be configured as a hardware component, as in the present embodiment, or additions can alternatively be performed in the digital signal processor 7. In the circuit diagram shown in FIG. 1, the adder 9 is provided outside the digital signal processor 7 in order to clearly show that the processing is performed after the count results are added.

Figure 2:
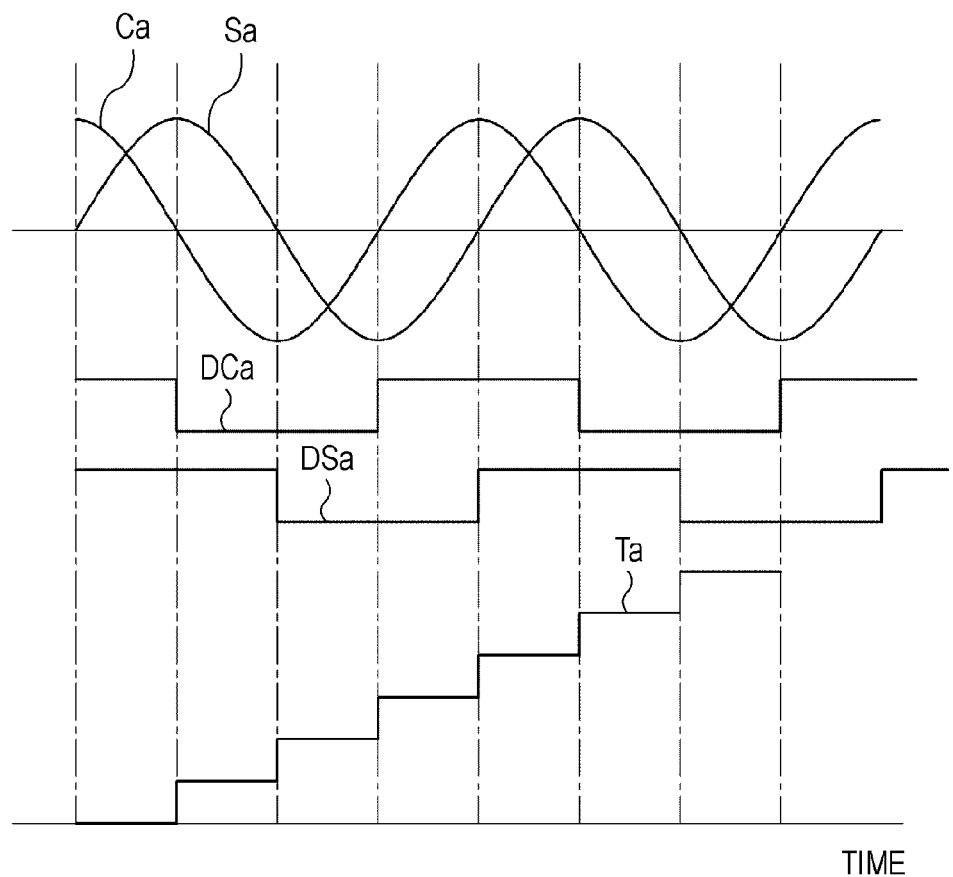
FIG. 2 illustrates signals output from detection units, binarization units, and counters.

FIG. 2 illustrates signals output from the detection units 3a and 3b, the binarization units 6a and 6b, and the counters 8a and 8b. Periodic signals Ca and Sa from the detection unit 3a are binarized to obtain binarized signals DCa and DSa. The rising and falling edges of the binarized signals DCa and DSa are counted to obtain a count result Ta. The count result Ta indicates changes in the count result with respect to the periodic signals Ca and Sa output from the detection unit 3a in which time is plotted in abscissa and the output value is plotted in ordinate. There are four rising and falling edges in one cycle of the periodic signals Ca and Sa. Thus, the count result Ta takes four values per cycle. Similar operation is performed on periodic signals Cb and Sb output from the detection unit 3b.

FIG. 2 shows the case in which the count result increases. If the direction of rotation is opposite, the count result decreases.

Figure 10:
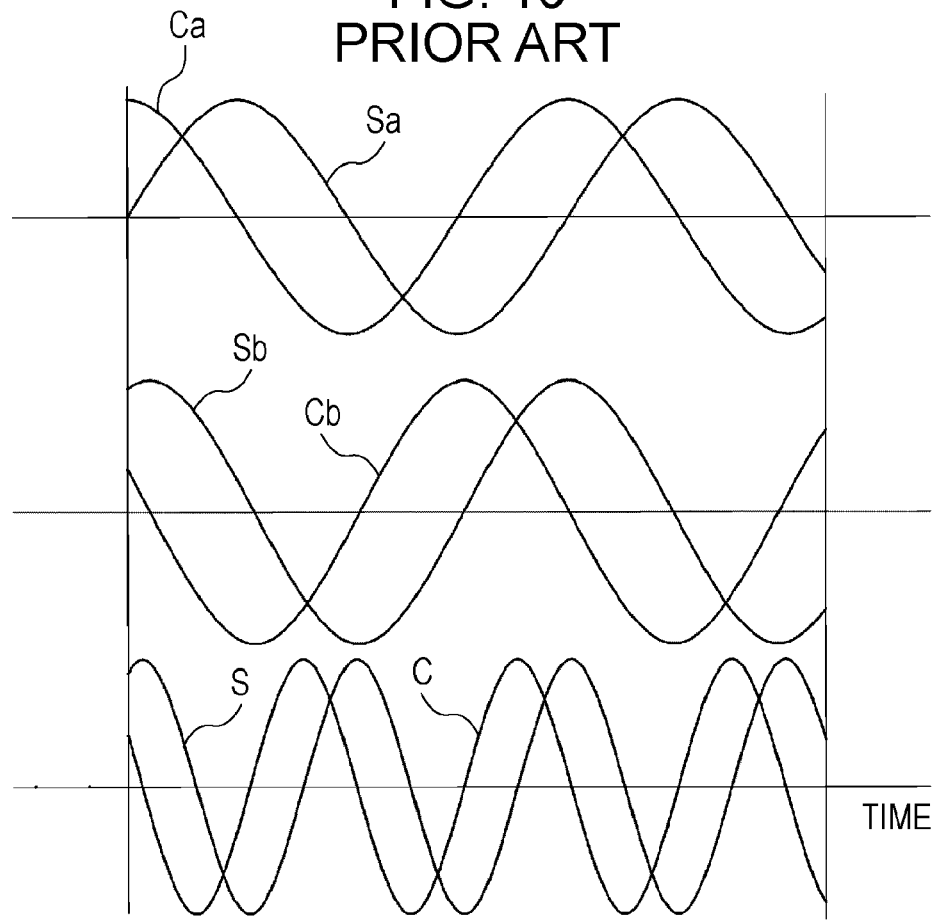
FIG. 10 illustrates calculations for combining periodic signals.

The digital signal processor 7 combines the two pairs of digitized periodic signals (Ca and Sa) and (Cb and Sb) using equation (1), as shown in FIG. 10. If the periodic signals (Ca and Sa) and (Cb and Sb) have relationships shown in two top rows of FIG. 10, the calculation results (C and S) have a relationship shown in the bottom row. Accordingly, the cycle is halved, and the phases of the periodic signals (Ca and Sa) and (Cb and Sb) are averaged, thereby reducing the effect of eccentricity.

Since the foregoing processing is realized with the digital signal processor 7 in the present embodiment, the processing is not performed on continuous signals, that is, analog signals, as shown in FIG. 10. Although the processing is illustrated using continuous signals so that the processing can be better imagined, the actual processing is performed at the predetermined time intervals characteristic of a digital signal.

Figure 3:
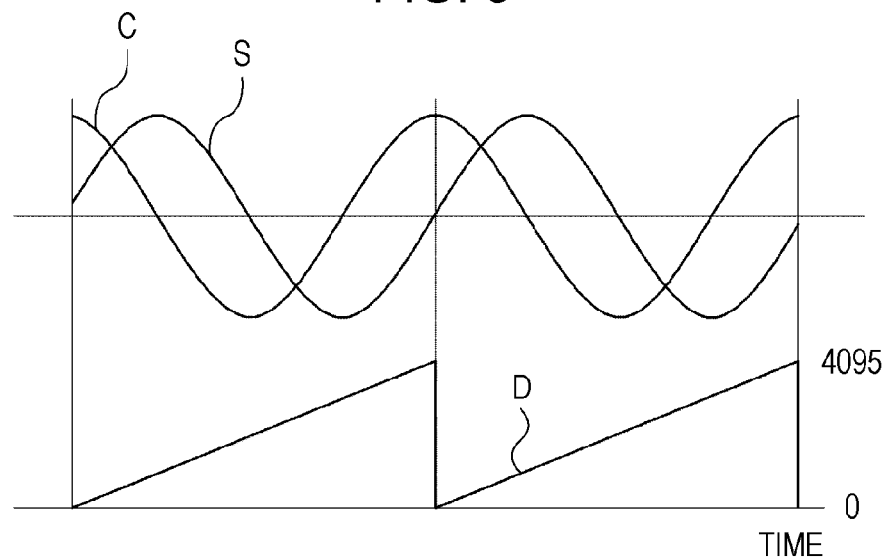
FIG. 3 illustrates the relationship between periodic signals and a division result.

FIG. 3 illustrates the relationship between periodic signals and a division result. A division result D has a triangular wave having the same cycle as that of the periodic signals. For example, if one cycle is divided into 4096 portions, the division result D takes values from 0 to 4095. The height of the triangular wave indicates the position of digital values with a resolution after the division in one cycle of the periodic signals. The resolution is 1/4096 of one cycle.

This division result D can be obtained using $\tan^{-1}(A/B)$, which is an inverse tangent trigonometric function, where A and B are a pair of periodic signals. In actual applications, the trigonometric function is not generally calculated in real-time. Instead, the trigonometric function is calculated in advance, and a table is created. Using the value A/B or B/A as an index, reference is made to the table. In any case, division calculations are necessary.

As in FIG. 10, FIG. 3 illustrates the processing using continuous signals. Actually, however, these signals are digital signals having digital values at the predetermined time intervals characteristic of a digital signal. Division processing allows determination of the positions of digital values obtained at the predetermined time intervals in the cycle of the periodic signals.

Since multiplication, addition, and subtraction are performed on the digital values obtained at the predetermined time intervals using the digital signal processor 7, the results of multiplication, addition, and subtraction cannot be used as analog signals, that is, continuous signals. In other words, since the digital signals are obtained at the predetermined time intervals, the number of cycles of the periodic signals within the predetermined time interval cannot be measured.

In order to prevent any omission of the cycle information, signals from the detection units 3a and 3b remain as analog signals, and, using the analog signals, binarization, counting, and addition are performed. Hardware components for performing binarization, counting, and addition can be easily configured. Alternatively, since the cycle information can be maintained only by performing binarization and counting using hardware components, addition can be performed using the digital signal processor 7.

The added result is taken into the digital signal processor 7 at the predetermined time intervals. With a combination of the added result and a divided value obtained by performing multiplication, addition, and subtraction of the analog-to-digital-converted values of the periodic signals and by calculating one division, desired angle information is obtained.

In order to obtain the final angle information, information indicating the number of cycles between a reference position and a target cycle, that is, a cycle taken into the digital signal processor 7, is necessary. This information can be obtained by counting the binarized signals and adding the count results. In order to obtain rotation-angle information, the value of the division result D is combined with the added result indicating the number of cycles of the periodic signals relative to the reference position. If the cycle is divided into 4096 portions, the added result is multiplied by 4096, and this product is added to the division result D, thereby obtaining angle information. That is, the angle information is obtained using the following equation:

(angle at final resolution)=[(number of cycles from reference)*4096]+division result  (2)

If the cycle of the periodic signals coincides with the cycle of counting, angle information can be obtained with the foregoing processing. Since the periodic signals are combined using the digital signal processor 7 in the present embodiment, the periodic signals C and S obtained as a result of combining the original periodic signals do not exist as analog signals.

According to the rotation-angle detecting apparatus of the present embodiment, rotation-angle information is computed without counting the periodic signals (C and S) which are to be divided. Accordingly, the rotation-angle detecting apparatus of the present embodiment need not perform multiplication, addition, and subtraction for obtaining the periodic signals (C and S) using hardware components. As a result, the cost of the rotation-angle detecting apparatus can be reduced. Since only one division calculation involving a division needs to be performed in the rotation-angle detecting apparatus of the present embodiment, the calculation time can be reduced.

Figure 4:
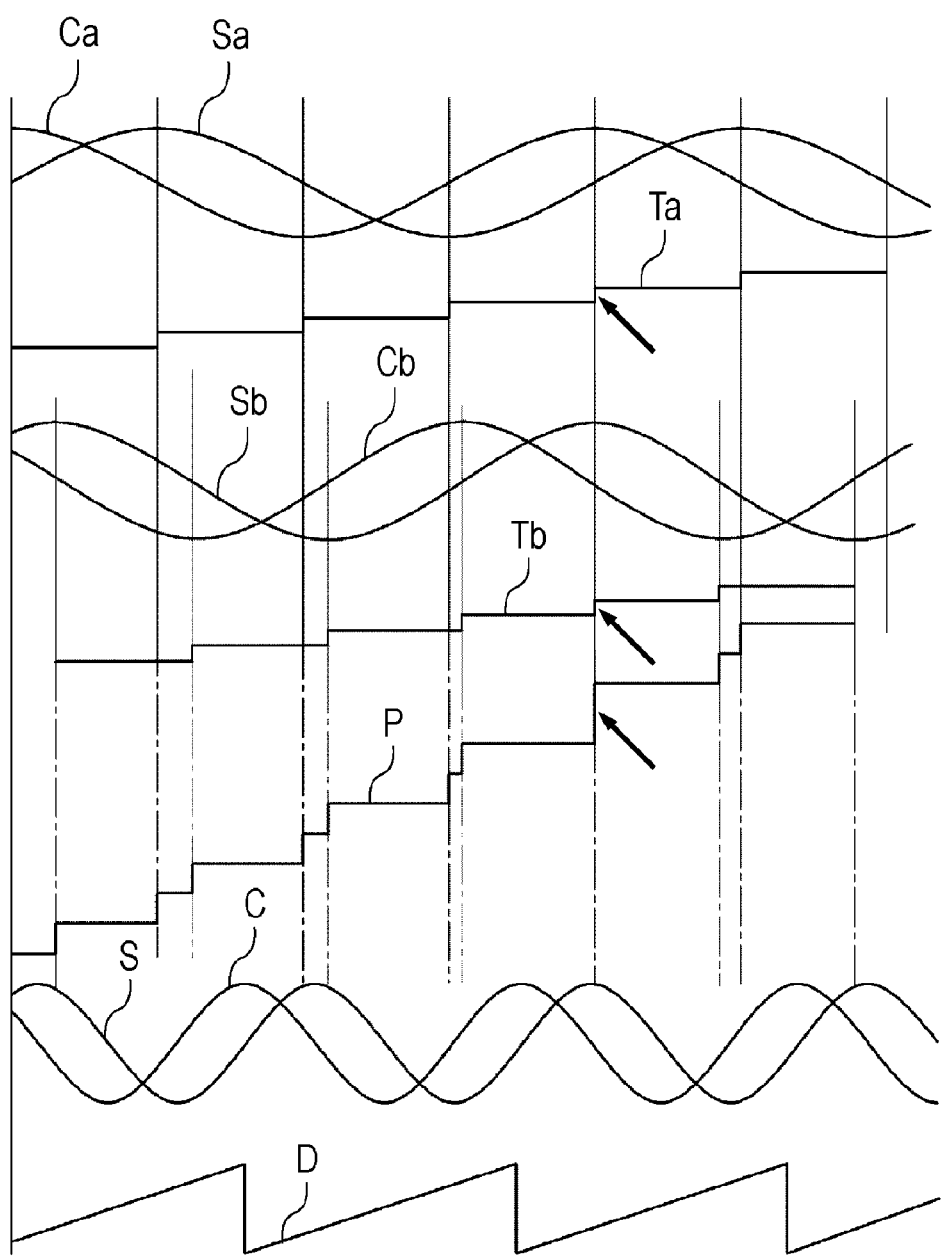
FIG. 4 illustrates the relationship among the periodic signals, the division result, and the sum of count results.

FIG. 4 illustrates the case in which the rising and falling edges of binarized signals of the pair of periodic signals (Ca and Sa) and (Cb and Sb) are counted to obtain count information of the periodic signals C and S, and these pieces of count information are added to obtain P, which is increasing. The count value increases by one at every rising and falling edge. P indicates the sum of count values Ta and Tb of the periodic signals.

Although the count value generally increases by one, as indicated by the arrows in FIG. 4, the count value increases by two at a point where the rising/falling edges occur at the same time. The periodic signals C and S are illustrated such that the periodic signals C and S obtained using the digital signal processor 7 can be better imagined. In the actual processing, signals are obtained at the predetermined time intervals.

In order to obtain angle information, the number of cycles of the periodic signals C and S relative to the reference position must be obtained based on the count sum P.

Figure 5:
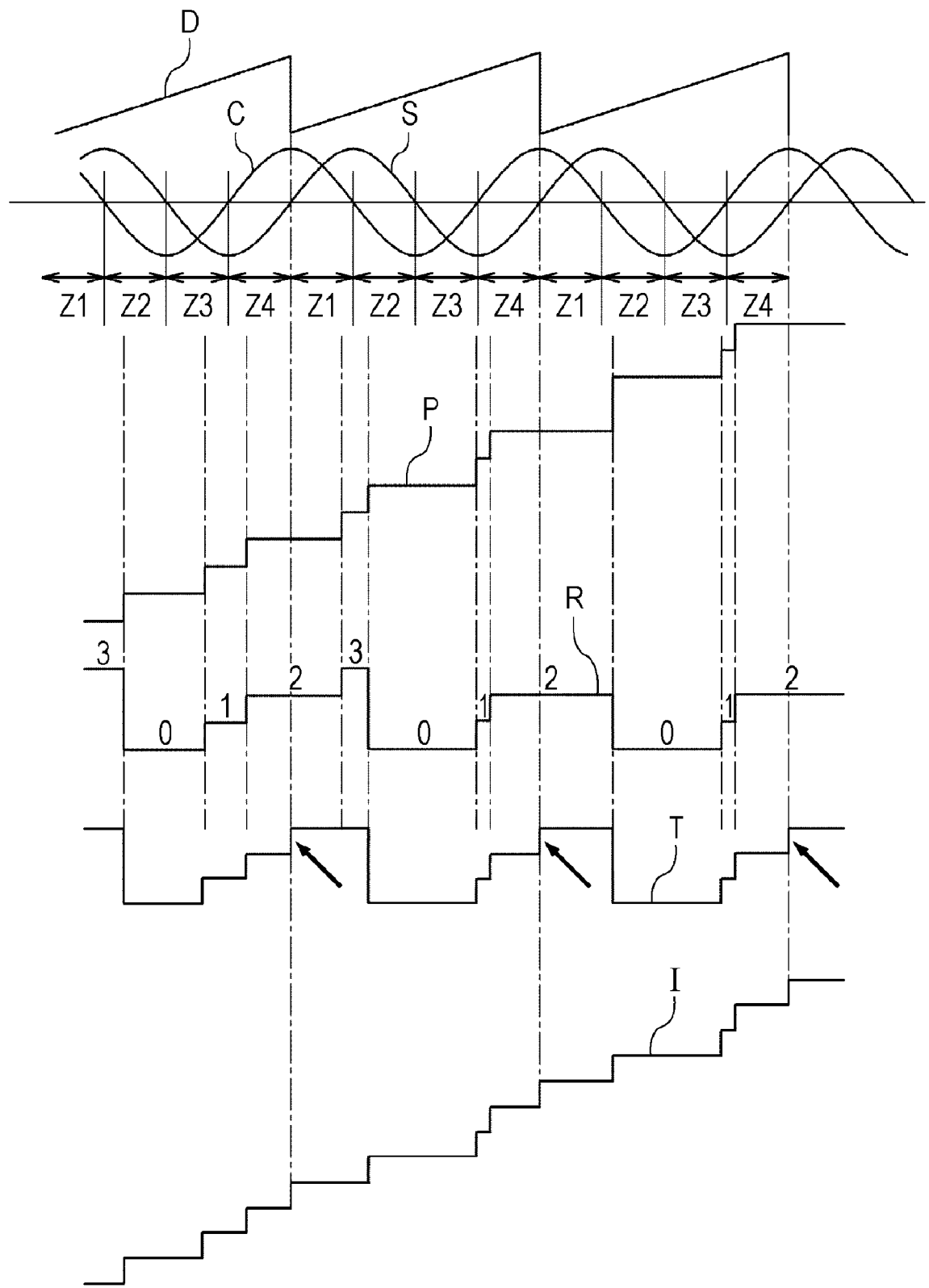
FIG. 5 illustrates the periodic signals, the division result, and the remainder of the sum of count results divided by four.

Referring to FIG. 5, C and S represent the periodic signals obtained as a result of combining the original periodic signals so that the periodic signals C and S can be better imagined; D represents the division result of the periodic signals; P represents the sum of count values of the periodic signals; and R represents the remainder of the count sum divided by four. R repeatedly takes values from zero to three.

The cycle of the two periodic signals C and S is separated into four areas Z1 to Z4 depending on the sign of the periodic signals C and S:
Z1: both C and S are positive or zero
Z2: C is negative, and S is positive or zero
Z3: both C and S are negative
Z4: C is positive or zero, and S is negative Since counting is performed four times per cycle, if counting starts at a predetermined phase of each of the pairs of periodic signals (Ca and Sa) and (Cb and Sb), the phase of the periodic signals (C and S) and the remainder R of the count result divided by four has a specific relationship. Referring to FIG. 5, the edge of the cycle of the division result D corresponds to a remainder R of two.

As a result, the edge of the division result D, that is, a vertical portion of the triangular wave, always coincides with a remainder R of a specific value. Using this relationship, the count sum is corrected. This correction includes the following two functions.

In reading of the counters 8a and 8b and of the analog-to-digital converters 5a and 5b, if rising/falling edges of binarized signals are simultaneously read, a timing difference may occur. Therefore, it is necessary to match the timing.

Depending on the reading timing, the count value may change by two. Also, the edge of the cycle of the division result D shown in FIG. 5 may not correspond to a remainder R of two. Thus, measures must be taken to overcome these problems as well.

In FIG. 5, the lowest position of the remainder R is zero, and the highest position is three. Using information regarding the remainder R and the areas Z1 to Z4, the count sum P is corrected depending on the following combinations of the remainder R and the areas Z1 and Z4.

In the areas Z1 to Z4, the following processing is performed depending on the remainder R:
In Z1, if the remainder R is two, the remainder R is increased by one to obtain three;
In Z1, if the remainder R is one, the remainder R is increased by two to obtain three;
In Z4, if the remainder R is three, the remainder R is reduced by one to obtain two; and
In Z4, if the remainder R is one, the remainder R is increased by one to obtain two.

After this processing, the relationship between the division result D and the corrected remainder R is indicated by a corrected value T in FIG. 5. The corrected value T takes values 3, 0, 1, and 2 on a cycle-by-cycle basis. The edge of the division result D coincides with the timing of the counting. Portions indicated by the arrows are points where the timing has been changed by correction.

Figure 6:
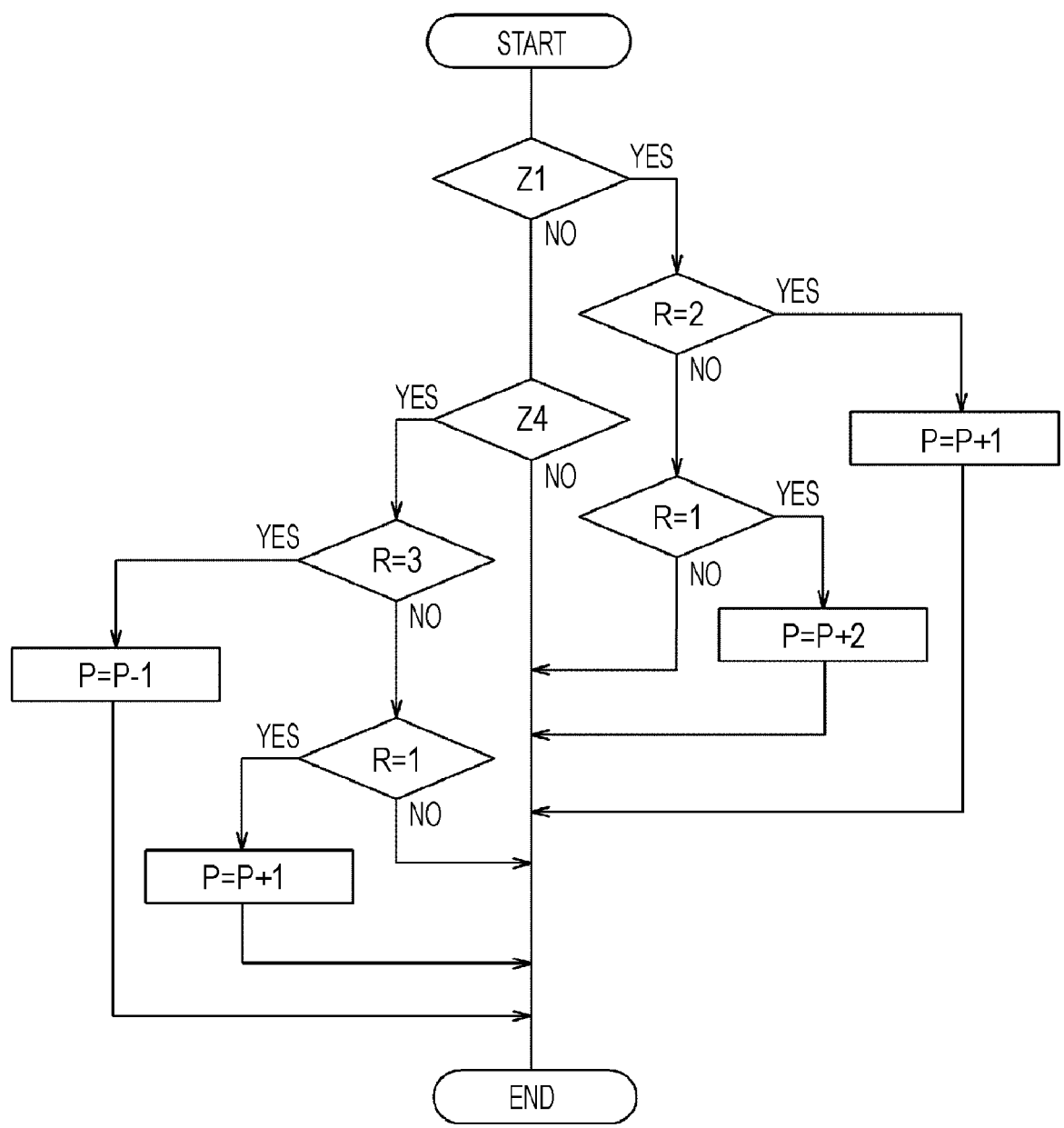
FIG. 6 is a flowchart of a process of obtaining a corrected value of the sum of count values.

Next, the count sum P is corrected at the corrected timing, thereby obtaining a corrected value I. FIG. 6 is a flowchart of a process of obtaining this corrected value I. The corrected value I of the count sum P can be obtained using the areas Z1 to Z4 and the value of the remainder R.

Figure 7:
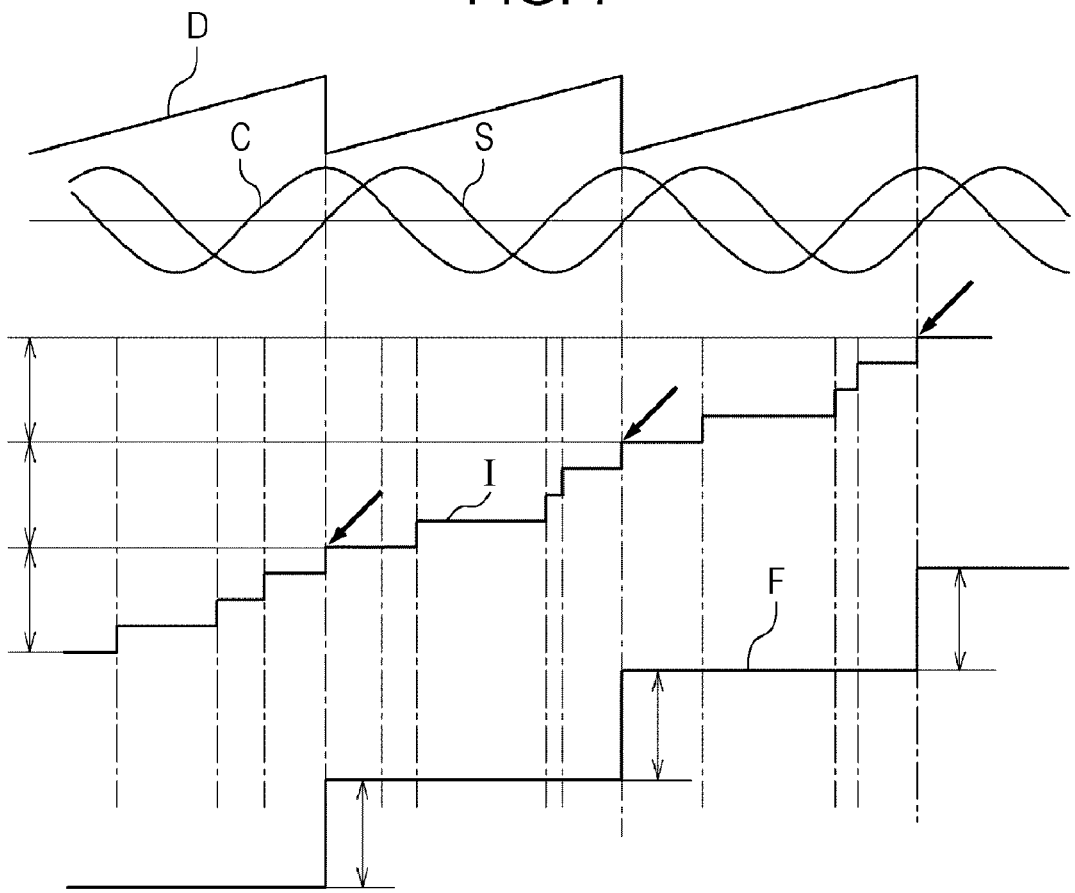
FIG. 7 illustrates the periodic signals, the division result, and correction of the sum of count values.

FIG. 7 illustrates the relationship among the division result D, the combined periodic signals C and S, and the corrected value I of the count sum P. In the corrected value I, corrected portions are points where the edge of the division result D coincides with the timing of the counting, which are indicated by the diagonal arrows.

The length of a horizontal portion of each step of the corrected value I varies depending on the relationship between the two pairs of periodic signals (Ca and Sa) and (Cb and Sb). The count value increases by four between one edge and the next edge of the division result D, which corresponds to the height indicated by the vertical arrows.

When the count value is increased by four at every edge of the division result D, a count value F is obtained. With the foregoing processing, the count value F coinciding with the edge of the division result D is obtained.

Figure 8:
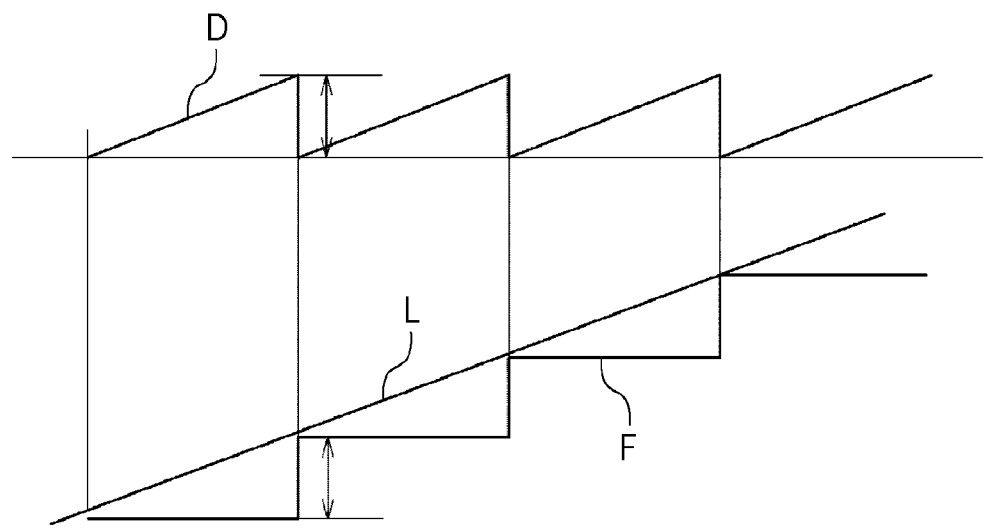
FIG. 8 illustrates the manner in which angle information is obtained.
Figure 9:
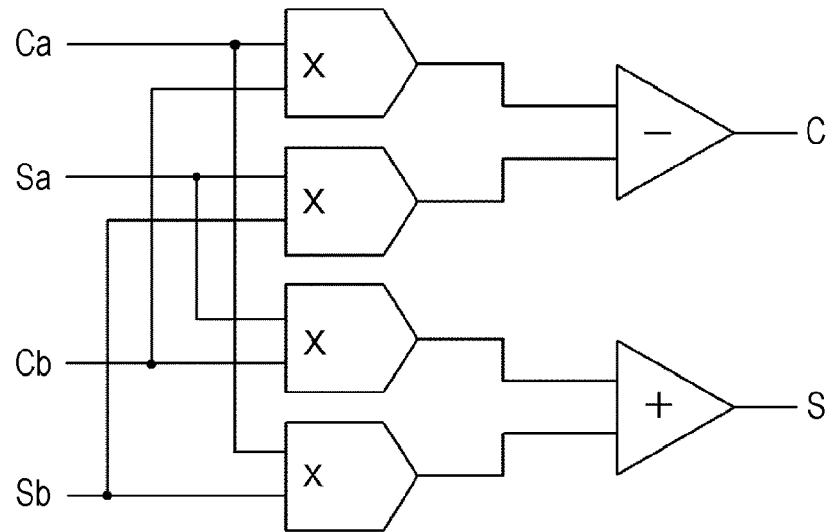
FIG. 9 is a diagram showing circuits for use in a first known method.

FIG. 8 illustrates the division result D and the count value F, which are extracted from FIG. 7. The height of the triangular wave of the division result D coincides with the height of one step of the count value F. When the division result D and the count value F are added, a continuous line L is obtained, which serves as the final division-angle signal, that is, rotation-angle information.

Although the case in which the two detection units 3a and 3b are used has been described in the present embodiment, the number of detection units is not limited to two since the processing described in the present embodiment only needs to be performed on the two pairs of periodic signals.

According to the rotation-angle detecting apparatus of the present embodiment, rotation-angle information can be computed without counting the periodic signals which are to be divided. Accordingly, the cost of a hardware component for combining periodic signals becomes unnecessary. Since only one division calculation involving a division needs to be performed, the calculation time can be reduced.

Since the processing is performed after the periodic signals are converted into digital signals, offset, amplitude, and phase adjustment of the periodic signals can be easily performed using digital signal processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-034442 filed Feb. 15, 2007, which is hereby incorporated by reference herein in its entirety.

What is claimed is:

1. A rotation-angle detecting apparatus for detecting a rotation angle of a rotating disc having radial markings, comprising:
  a plurality of detectors arranged at opposite sides of the axis of rotation of the rotating disc and facing said markings, each of the plurality of detectors operable to detect a light beam from said markings, each of said detectors outputting a pair of periodic signals having a 90-degree phase difference between the members of the pair;
  an analog-to-digital converter arranged to convert a plurality of pairs of periodic signals from the plurality of detectors into a plurality of pairs of digital signals;
  a digital signal processor configured to process the plurality of pairs of digital signals from the analog-to-digital converter;
  a binarization unit arranged to binarize the plurality of pairs of periodic signals from the plurality of detectors; and
  a counter arranged to count the plurality of pairs of periodic signals binarized by the binarization unit,
  wherein the digital signal processor determines the rotation angle of the rotating disc based on the plurality of pairs of digital signals from the analog-to-digital converter and count results from the counter, and
  wherein the digital signal processor determines the rotation angle of the rotating disc based on a pair of digital values obtained by averaging the plurality of pairs of digital signals corresponding to the plurality of pairs of periodic signals from the plurality of detectors by performing multiplication, addition, and subtraction, and based on a sum of the count results from the counter.

* * * * *